W. STEPHENS.
SLIDE REST FOR LATHES.
No. 12,423.
PATENTED FEB. 20, 1855.
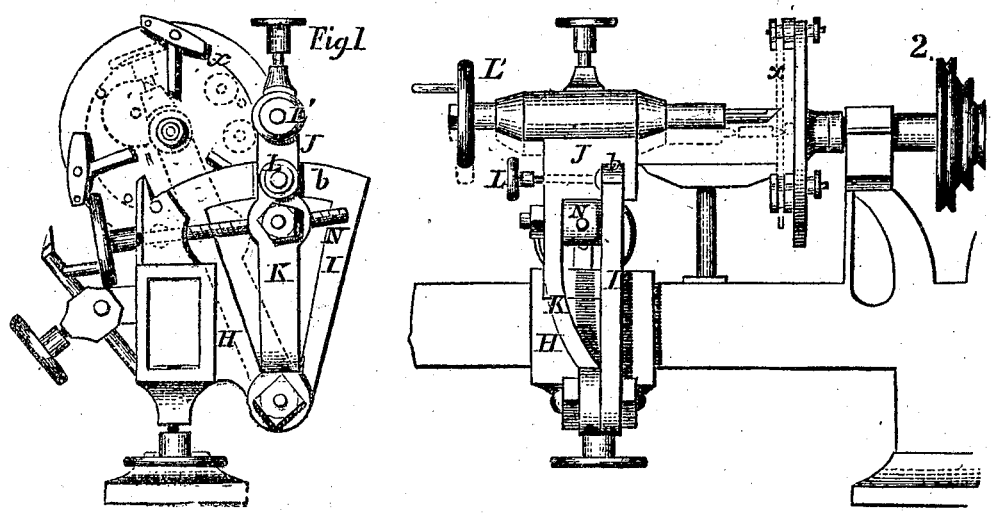
Taken From Patent Office Report
1855 -Vol. II.
Only Drawing Accessible (1913)

UNITED STATES PATENT OFFICE.

WILLIAM STEPHENS, OF RICHMOND, INDIANA.

SLIDE-REST FOR LATHES.

Specification of Letters Patent No. 12,423, dated February 20, 1855.

*To all whom it may concern:*

Be it known that I, WILLIAM STEPHENS, of Richmond, in the county of Wayne and State of Indiana, have invented a new and Improved Lathe; and I do hereby declare that the following is a full, clear, and exact description of the same, reference being had to the annexed drawings, making a part of this specification, in which—

Figure 1, is an end view of my improved lathe. Fig. 2, is a side view of ditto.

Similar letters of reference indicate corresponding parts in the two figures.

This invention relates to a new and useful improvement in lathes for turning, and consists in the peculiar arrangement and attachment of the puppet head to the lathe, whereby said puppet head may be adjusted so as to turn articles between the centers as in an ordinary lathe, and the puppet head be also adjusted so as to be used as a slide rest for facing off plates properly chucked in the lathe.

To enable others skilled in the art to make and use my invention, I will proceed to describe its construction and operation.

A, represents the bed of the lathe, having the usual stationary head B, at one end on which a spindle C, works in suitable bearings said spindle being provided with a cone of pulleys D, see Fig. 2.

E, is the rest which works on the rod F, at one side of the bed A, the rest being provided with a set screw G, for the purpose of securing it at desired points on the rod F, see Fig. 1.

H, is a rectangular socket or collar which works on the bed A, which is also of rectangular form as clearly shown in Fig. 1. To one side of the socket or collar H, there is secured a sector frame I. The socket or collar may be secured at any point on the bed A, by a set screw H'.

J, is the puppet head, the lower part of which is fitted on the arc (*b*) of the sector frame so that it may move back and forth thereon. To the lower end of the puppet head there is attached an arm K, the lower part of which is secured by a bolt (*c*) to the lower end of the sector frame, the arm being allowed to turn on the bolt. L, is a set screw which passes through the puppet head for the purpose of securing it at any desired point on the arc (*b*).

On the upper part of the socket or collar H, there is a projection M, through which a screw rod N, passes, said rod N, having upon it a ball (*d*) see more particularly dotted lines Fig. 1, which fits or works in corresponding cavities in the projection M. The screw rod N, also works in a nut (*e*) attached to the arm K, of the puppet head. The nut (*e*) is not permanently attached to the arm K, but is allowed to turn on the arm.

O, is a hand wheel at one end of the screw rod N.

P, is the mandrel of the puppet head constructed and arranged in the usual manner. The inner end of the mandrel is provided with a recess so that either a point or cutting tool may be inserted therein.

When the lathe is to be used for turning by placing the article between the centers of the two heads, the puppet head J, by turning the screw rod N, is brought in the position shown in red in both figures and a point being inserted in the inner end of the mandrel P, the points of the mandrel P, and spindle C, will be in line, the puppet head is then secured to the arc (*b*) by operating or adjusting the set screw L. The lathe may now be used as an ordinary turning lathe. But if plates require to be faced off they are chucked in the usual manner on the inner end of the spindle C, the rest E, is thrown back as shown in Fig. 1, and the set screw L, is relaxed. Now by moving the puppet head back and forth upon the arc (*b*), by turning the screw rod N, the puppet head is converted into a slide rest, a cutting tool being placed in the inner end of the mandrel P, instead of a point.

A series of circular plates may all be cut of the exact size upon a chuck by securing the puppet head on the arch (*b*) at the proper point.

This lathe is valuable to watch makers, and other artisans. It is extremely simple, not liable to get out of repair, nor expensive to manufacture.

Having thus described my invention, what I claim as new and desire to secure by Letters Patent, is—

Attaching the puppet head J, to the lathe as herein shown and described, viz, by having a sector frame I, attached to the socket or collar H, and having an arm K, at the lower part of the puppet head the lower end of the arm being secured to the lower end of the sector frame, and the puppet head fitting or working on the arc (*b*) of the sector frame. The puppet head being operated or moved by a screw rod N, or its equivalent and secured at any desired point on the arc (b) by a set screw L. By which the puppet head may
5 be so adjusted as to allow articles to be turned between the centers of the spindle and mandrel as in ordinary lathes or the puppet head be used as a slide rest for facing or cutting plates on a chuck as herein described.

WILLIAM STEPHENS.

Witnesses:
 LEONARD LEE,
 BENJAMIN H. BROWN.